W. M. HENDERSON.
TRACTOR WHEEL.
APPLICATION FILED SEPT. 3, 1919.
1,419,050.
Patented June 6, 1922.
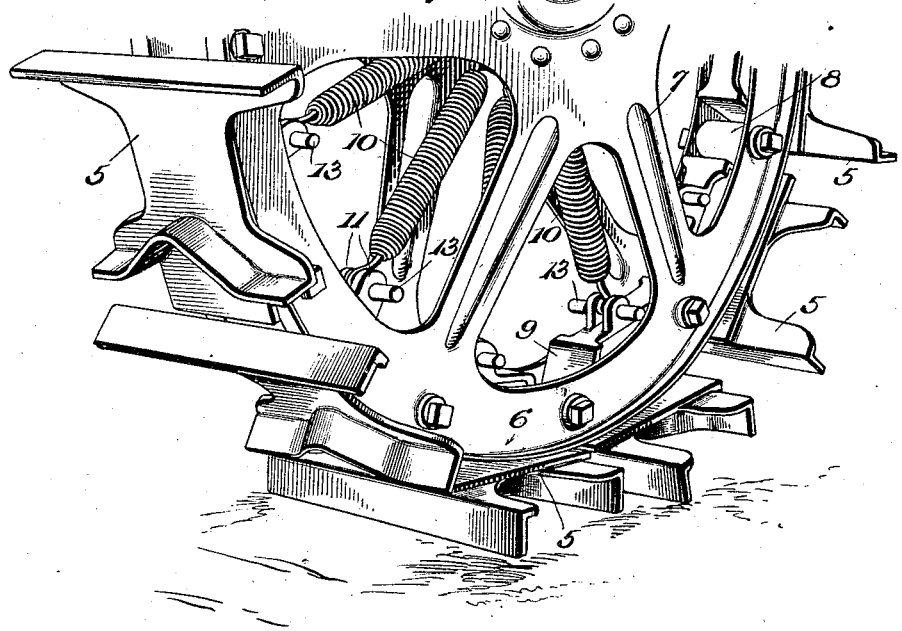
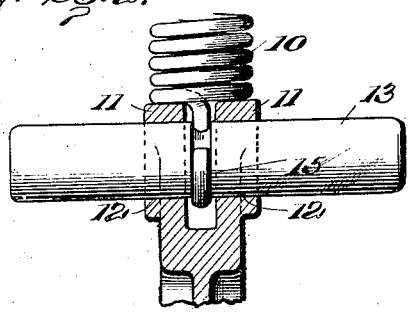
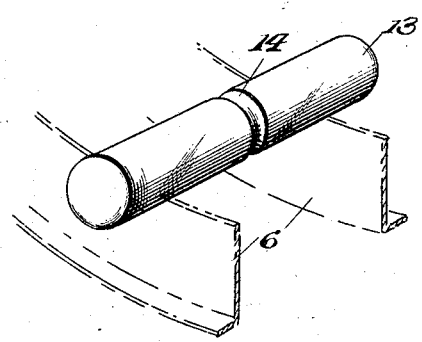
Inventor:
William M. Henderson
by Jas. A. Richmond
his Atty.

UNITED STATES PATENT OFFICE.

WILLIAM M. HENDERSON, OF EASTON, PENNSYLVANIA, ASSIGNOR TO WILLIAM WHARTON, JR. & CO., INCORPORATED, OF EASTON, PENNSYLVANIA, A CORPORATION OF PENNSYLVANIA.

TRACTOR WHEEL.

1,419,050.      Specification of Letters Patent.      Patented June 6, 1922.

Application filed September 3, 1919. Serial No. 321,419.

*To all whom it may concern:*

Be it known that I, WILLIAM M. HENDERSON, a citizen of the United States, residing at Easton, in the county of Northampton and State of Pennsylvania, have invented certain new and useful Improvements in Tractor Wheels, of which the following is a specification.

My invention relates to wheels of the self-laying track type and more particularly to tractor wheels such as shown in Letters Patent 1,298,781 to Pavesi and Tolotti. In this type of wheel the cleats, pads, or track-laying units are carried by spring supports and co-operate with rollers.

The objects of my invention are to provide against loss of pads and to provide means for connecting the pads and their spring supports without resorting to cotter pins and the like.

The nature, characteristic features and scope of the invention will more readily be understood from the following description taken in connection with the accompanying drawings, forming a part hereof, wherein—

Figure 1 is a fragmentary perspective view of a tractor wheel embodying my improvements.

Fig. 2 is a sectional-elevational view, showing the general arrangement of the spring supports, safety pins, and pads.

Fig. 3 is a detail, showing the relative arrangement of the safety or cross pins, and the dual rim.

Referring to the drawings, the numeral 5 designates pads, cleats, or track-laying elements, which are accommodated between the rim sections 6 of a wheel 7. As in the patent hereinbefore referred to, there are rollers 8 which co-operate with the curved ends 9 of the pads. Coiled springs 10 connect the pads with the hub. According to my invention the pads are provided with lugs 11 having openings 12 for the reception of a pin 13 of sufficient length to overhang the rim sections 6, so that in the event the pad is parted from its spring suspension the pin will straddle the rim, as in Fig. 3, and prevent loss of the pad. That part of the pin intermediate the lugs 11 is formed or provided with an annular groove 14, which receives the ring-like terminal 15 of the spring. Evidently this construction and arrangement forms an effective and economical means of connecting the pads and their radial spring supports.

Having described my invention, I claim:—

1. In a wheel of the type recited, the combination with floating track-laying units or pads, of a dual rim constituting guides for the pads, hub suspensions for the pads, and cross pins coupling said suspensions with the pads and adapted to straddle the rim in the event the pads are released from their suspension.

2. In a wheel of the type recited, the combination of floating track-laying units or pads having lugs with registering openings, cross pins adapted to said openings and whereof each is provided with a central annular groove, and spring supports for said pads and whereof each is provided with a ring-like terminal adapted to said groove.

In testimony whereof I affix my signature.

WILLIAM M. HENDERSON.